United States Patent
Rogers et al.

(10) Patent No.: US 7,130,716 B2
(45) Date of Patent: Oct. 31, 2006

(54) SYSTEM OF PATH PLANNING FOR ROBOTIC MANIPULATORS BASED ON MAXIMUM ACCELERATION AND FINITE JERK CONSTRAINTS

(75) Inventors: John Rogers, Moraga, CA (US); Prasad Padmanabhan, Kensington, CA (US); Paul Sagues, Ross, CA (US)

(73) Assignee: Berkeley Process Control, Inc., Richmond, CA (US)

( * ) Notice: Subject to any disclaimer, the term of this patent is extended or adjusted under 35 U.S.C. 154(b) by 0 days.

(21) Appl. No.: 10/830,974

(22) Filed: Apr. 22, 2004

(65) Prior Publication Data

US 2004/0249509 A1 Dec. 9, 2004

Related U.S. Application Data

(60) Provisional application No. 60/464,928, filed on Apr. 22, 2003.

(51) Int. Cl.
G06F 7/00 (2006.01)

(52) U.S. Cl. .................. 700/218; 700/213; 700/69; 700/262

(58) Field of Classification Search ............... 700/213, 700/218, 33, 69, 245, 250, 262; 414/935–939, 414/941
See application file for complete search history.

(56) References Cited

U.S. PATENT DOCUMENTS

| 5,179,514 | A | * | 1/1993 | Rastegar et al. ............... 700/63 |
| 5,655,060 | A | | 8/1997 | Lucas .......................... 395/85 |
| 5,910,893 | A | * | 6/1999 | Itoh ............................ 700/56 |
| 6,216,058 | B1 | | 4/2001 | Hosek et al. ................ 700/245 |
| 6,246,923 | B1 | * | 6/2001 | Sugimura et al. ........... 700/218 |
| 6,454,517 | B1 | * | 9/2002 | Ohno ......................... 414/783 |
| 6,567,711 | B1 | * | 5/2003 | Hosek et al. ................. 700/55 |

* cited by examiner

*Primary Examiner*—Khoi H. Tran
(74) *Attorney, Agent, or Firm*—David H. Jaffer; Pillsbury Winthrop Shaw Pittman LLP (57) ABSTRACT

A system for wafer handling employing a complex numerical method for calculating a path of wafer travel that controls wafer acceleration and jerk, and results in maximum safe speed of wafer movement from a first point to a second point. Motion is begun along a straight line segment while accelerating to a first path velocity. During this acceleration, the system computer calculates a series of straight line segments and interconnecting sinusiodally shaped paths over which the wafer is to be guided to the second point. The straight line segments and sinusiodally shaped paths are calculated so as to minimize total path length and the time required to move the wafer from the first point to the second point. The system computes the point of entrance and exit to and from each straight and sinusoidal path.

3 Claims, 11 Drawing Sheets

FIG 1

Prior Art

FIG 2

Prior Art

SYSTEM OF PATH PLANNING FOR ROBOTIC MANIPULATORS BASED ON MAXIMUM ACCELERATION AND FINITE JERK CONSTRAINTS

The present application claims priority from U.S. Provisional Patent Application Ser. No. 60/464,928 filed Apr. 22, 2003.

BACKGROUND OF THE INVENTION

1. Field of the Invention

The present invention relates generally to wafer handling systems, and more particularly to a system that allows wafers to be moved from point to point under known conditions of acceleration and velocity as well as the rate-of-change of derivative of acceleration called jerk.

2. Description of the Prior Art

In the processing of semiconductor wafers, from which semiconductor chips are produced, the wafers must be transferred from one location to another. In the majority of semiconductor processes, the wafers are oriented such that the disk is parallel to the plane of the floor (the planer orientation). Although the wafer can be rotated such that it is non-planer with the floor in order to facilitate certain semiconductor processes, most of the wafer handling from the wafer storage device, through the tool and then back into another wafer storage device is done with the wafer in this planer orientation. This invention concerns semiconductor wafers or similar substrates that are moving in planer space.

Modern semiconductor wafer processing machines move the wafers with wafer handling robots. Wafer handling robots consist of mechanisms optimized for moving wafers. Some semiconductor processes are conducted in a vacuum chamber. As a result, some of the wafer handling robots operate inside the vacuum environment and some wafer handling robots operate outside the vacuum environment. So called atmospheric wafer handling robots handle wafers outside the vacuum chamber and serve to pass wafers to and from the vacuum robot which operates inside the vacuum chamber. All wafer handling robots are equipped with a manipulator which hold the wafer on the end of the robot arm. Sometimes the wafers are grasped by the manipulator. Other times, the wafer simply rests on tiny pads without otherwise being held by the manipulator.

SUMMARY

It is an object of the present invention to provide an improved system for wafer handling.

It is a further object of the present invention to provide a system for wafer handling that minimizes path length and maximizes safe wafer handling speed.

Briefly, a preferred embodiment of the present invention includes a system for wafer handling employing a complex numerical method for calculating a path of wafer travel that controls wafer acceleration and jerk, and results in maximum safe speed of wafer movement from a first point to a second point. Motion is begun along a straight line segment while accelerating to a first path velocity. During this acceleration, the system computer calculates a series of straight line segments and interconnecting sinusiodally shaped paths over which the wafer is to be guided to the second point. The straight line segments and sinusiodally shaped paths are calculated so as to minimize total path length and the time required to move the wafer from the first point to the second point. The system computes the point of entrance and exit to and from each straight and sinusoidal path.

DETAILED DESCRIPTION OF THE PREFERRED EMBODIMENT

Because wafers are expensive disks containing extremely complex semiconductor circuits, the wafers must be handled carefully. Bumping, jarring or otherwise mishandling the wafers can result in damage to the wafer or its delicate structures. In addition, sometimes the wafers are not gripped by the manipulator, they are prevented from being flung to their destruction only by friction between the wafer and manipulator. If the acceleration or rate of change of acceleration experienced by the wafer it too high, the valuable wafer can be damaged. Therefore, an object of this invention is to allow wafers to be moved from point to point under known conditions of acceleration and velocity as well as the rate-of-change or derivative of acceleration called jerk.

Figure 1:
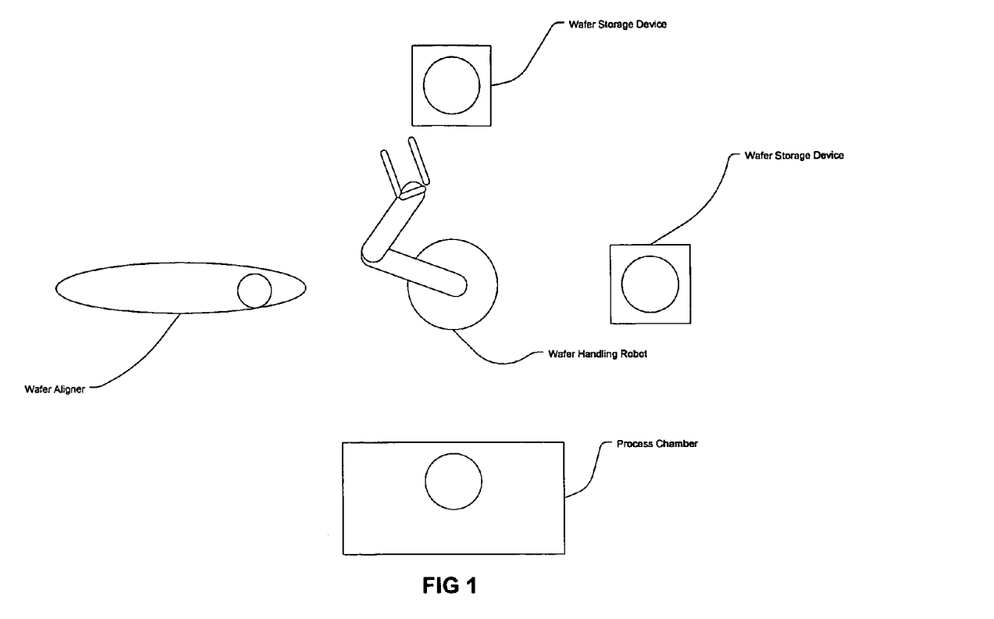
FIG. 1 illustrates the system of the present invention used for example for moving wafers between wafer aligner, process chamber and storage devices.

In general, a wafer cannot be moved from one location to another location via a simple straight-line path. In general, the wafer must be extracted from one storage location and then placed on or in another device or storage location. For example, a wafer might be removed from a storage device (a wafer cassette or a Front Opening Universal Pod (FOUP)) and then placed on a device called a wafer aligner that finds the center and aligns a wafer. After the alignment is complete, the wafer might be removed from the wafer aligner and placed in a wafer process chamber where some process might be performed. The process might include deposition, etch, implant or wafer cleaning, among other process steps. After the wafer is processed, it might be removed from the process chamber and then placed in the same or a different wafer storage device. See FIG. 1.

An object of the present invention is to insure that the wafer being moved from location to location is moved along a path that results in smooth motion of the wafer. At the same time, the wafer must be moved as quickly as possible along a direct path to insure that the time required to move the wafer from point to point is as short as practical. Although smoothness of wafer motion is critical, quickly moving the wafer is an imperative given the high cost of the wafer processing machines and therefore the high cost per hour of operation.

Recalling the basic laws of motion, we know that moving a wafer quickly from point to point requires a high acceleration and a high velocity, however there are limits on the magnitude and the rate of change of the acceleration. The rate of change of acceleration is usually called jerk. In order to minimize potential damage or slipping of the wafer, acceleration should be smooth and continuous—that is, jerk is not infinite—and maximum velocity should be attained quickly.

We also recall that in planer motion, there are components of the velocity, acceleration and jerk in two dimensions. A key to rapid, smooth wafer motion in a plane is to maintain control over velocity, jerk and acceleration in two dimensions.

The prior art attempts to blend multiple path segments into a single path. Thus the prior art employs pre-determined line- and arc-segment shapes (e.g. U.S. Pat. No. 6,216,058). In a standard polar-coordinate wafer handling robot, line segments allow the wafer to move radially while the arcs are concentric with the center of the robot. Unfortunately, the prior art, by virtue of its limited repertoire of paths, provides for motion along paths that are longer than are possible using the present invention. In addition, the prior art cannot maximize the acceleration in two dimensions.

The prior art does attempt to eliminate the need to stop between segments and arcs. So-called blended moves allow a second move to begin before a first move has completed. Whereas these blended moves result in somewhat faster wafer transfers, the path that the wafer takes is often longer than necessary as taught by the present invention.

Therefore, an objective of the present invention is to allow on-the-fly wafer paths to be determined between arbitrary starting and ending points that result in rapid transfer of the wafer with a known path acceleration and a finite jerk.

Figure 2:
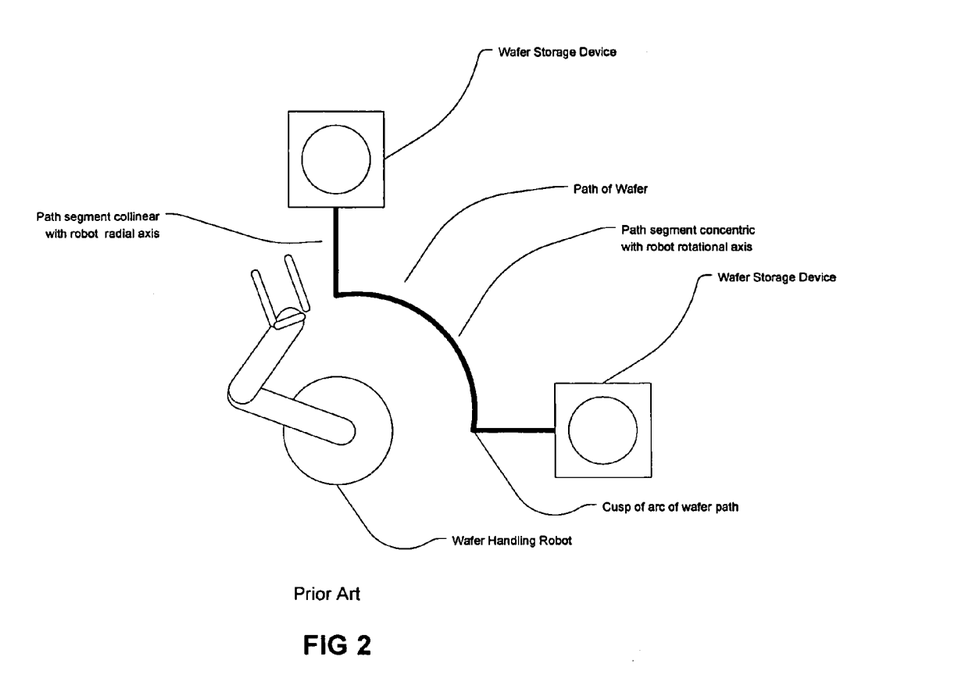
FIG. 2 illustrates a typical prior art path of wafer movement.

FIG. 2 shows a typical path utilized by the prior art. Note that it is obvious from observation that the path taken by the wafer is longer than a more direct path. Also, we note that considerable jerk occurs at the cusps of the arcs, as labeled unless the motion is stopped before reaching the cusps.

The present invention uses a very different method of determining the wafer path between the arbitrary wafer starting and stopping points. Whereas the prior art is limited to following arcs that are concentric to the robot axis and lines that are more or less radial, the present invention determines a path that is not only shorter—and therefore more direct—than the prior art, but the path guarantees that the acceleration of the wafer will be maximized, smooth and the jerk will be bounded. The benefit of the present invention is that wafers may be transferred smoother and faster using conventional wafer handling robotics.

In order to understand the teaching of the present invention, let us begin by examining the prior art with what appears to be a simple direct path between two wafer locations as shown in FIG. 2. The move begins with a line segment as the wafer is withdrawn from the wafer cassette. The move stops at the cusp in FIG. 2. The motion resumes as we enter a circular arc, ending at the second cusp. The transfer is completed at the end of the second line segment in FIG. 2.

Figure 3:
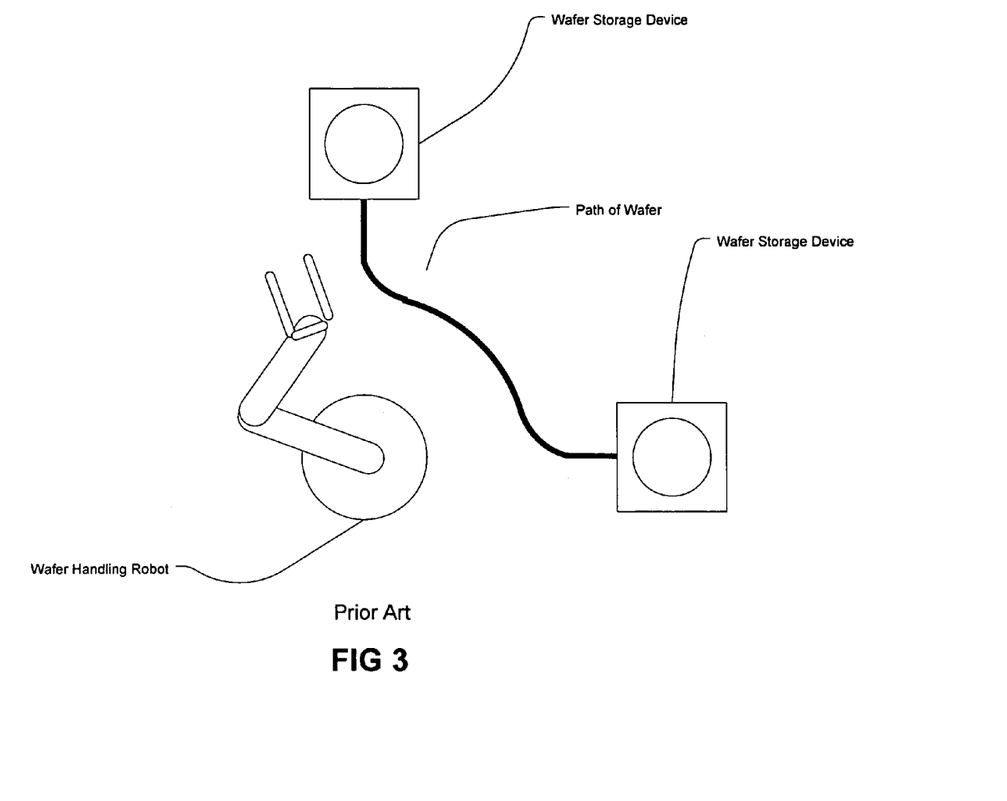
FIG. 3 shows a prior art path with rounded corners.

In FIG. 3, the prior art eliminates the need to stop at the cusps by taking advantage of the fact that a round substrate, for example a wafer, has no corners. Therefore, the radial movement can begin before the movement reaches the end of the first line segment. We are literally "cutting the corner" in FIG. 3. The path in FIG. 3 is therefore shorter than the path in FIG. 2. While the path in FIG. 3 is shorter than the path of FIG. 2, we note that the path is still not as short as a more direct path would be because the prior art necessarily follows a circular arc concentric with the rotational axis of the robot. That is, FIG. 3 differs from FIG. 2 only in the respect that the circular move is begun before the first radial move is complete.

Figure 4:
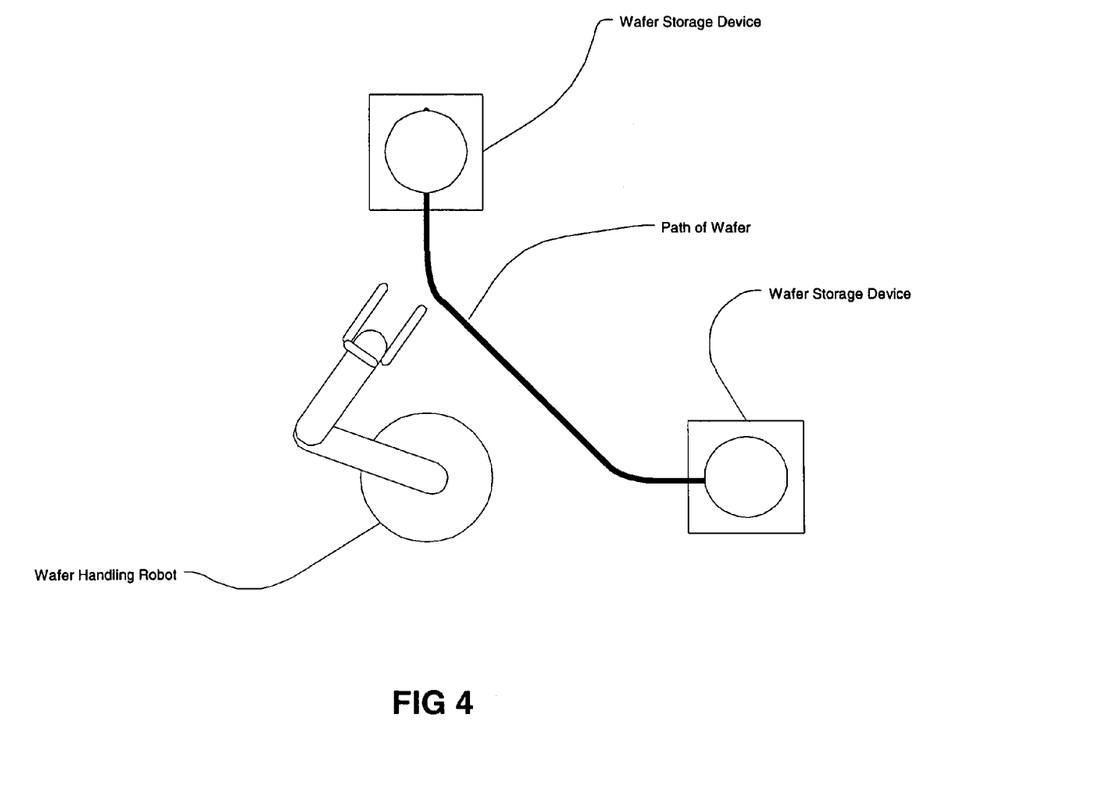
FIG. 4 illustrates a path according to the present invention.
Figure 5:
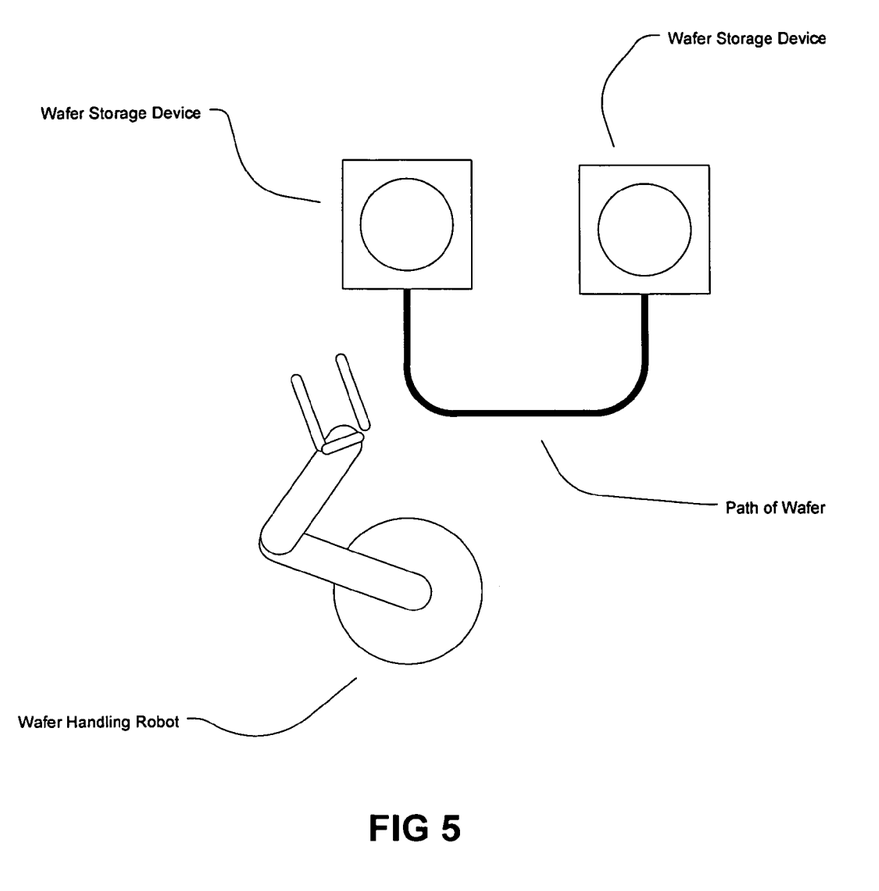
FIG. 5 illustrates another path according to the present invention.

The present invention joins the line segment and the arc segment in a very different manner. The present invention does not instantaneously begin the arc at the juncture with the line segment. Rather, a sinusoidal change in acceleration is imposed upon the wafer. Because the derivative of a sinusoid is also a sinusoid, the path taken by the wafer, as shown in FIG. 4 does not contain an instantaneous change in acceleration. Rather, the juncture between the line segment and the arc segment is much more gentle. We note that this path is considerably more complex than the prior art: the path of the wafer does not follow standard segments concentric or collinear with the robot axes. We also note that, compared to the prior art, the path of the present invention can achieve higher path accelerations than the prior art. Thus the present invention employs a shorter path and higher accelerations. Another example of a path according to the present invention is shown in FIG. 5.

The prior art, as represented by U.S. Pat. Nos. 5,655,060 and 6,216,058, overcomes the long-standing problem wherein the motion of the wafer stops at the termination of each path segment. The prior art attempts to reduce the time to transfer a wafer by blending one move into the next move. Refer to FIG. 2. Rather than waiting for the termination of the first segment at the cusp before beginning the second segment, the prior art begins the second segment before the end of the first segment. The resulting path is shown in FIG. 3. Although this path provides limited acceleration and finite jerk, the total acceleration of the wafer is lower than the maximum acceleration possible and the path is longer than necessary.

One reason for the poor behavior of the prior art is its use of fundamental trajectory shapes, meaning line segments oriented toward the center of the robot's axis of rotation and arcs whose centers are at the center of the robot's axis of rotation.

Another reason for the poor behavior of the prior art is its goal of numerical efficiency. The present invention utilizes a far more sophisticated and complicated numerical method, relying upon a significantly more powerful computer to perform the numerical calculations.

In contrast to the prior art, the present invention is not limited to a simple set of lines and arcs. Also, the present invention employs a far more complex numerical method. Whereas the prior art joins arcs to line segments all based upon the center of rotation of the robot, the present invention creates a path that results in limited wafer acceleration and a non-infinite jerk. Whereas the prior art wafer path is longer than necessary and subjects the wafer to lower acceleration than allowable, the present invention provides for a more direct wafer path and maximizes the acceleration of the wafer in two dimensions.

The present invention provides the transition from line to arc, arc to arc, and arc to line segments in planar space without imposing the boundary constraint that the velocity at the transition between move segments be zero. The sub-optimal motion along the straight line and the arc line will remain within a user specified, maximum acceleration. In addition, the total acceleration along the path will be continuously differentiable, causing the wafer jerk to be finite.

The wafer will travel at some speed Vout at the transition from the previous move segment to motion along the arc.

Figure 6:
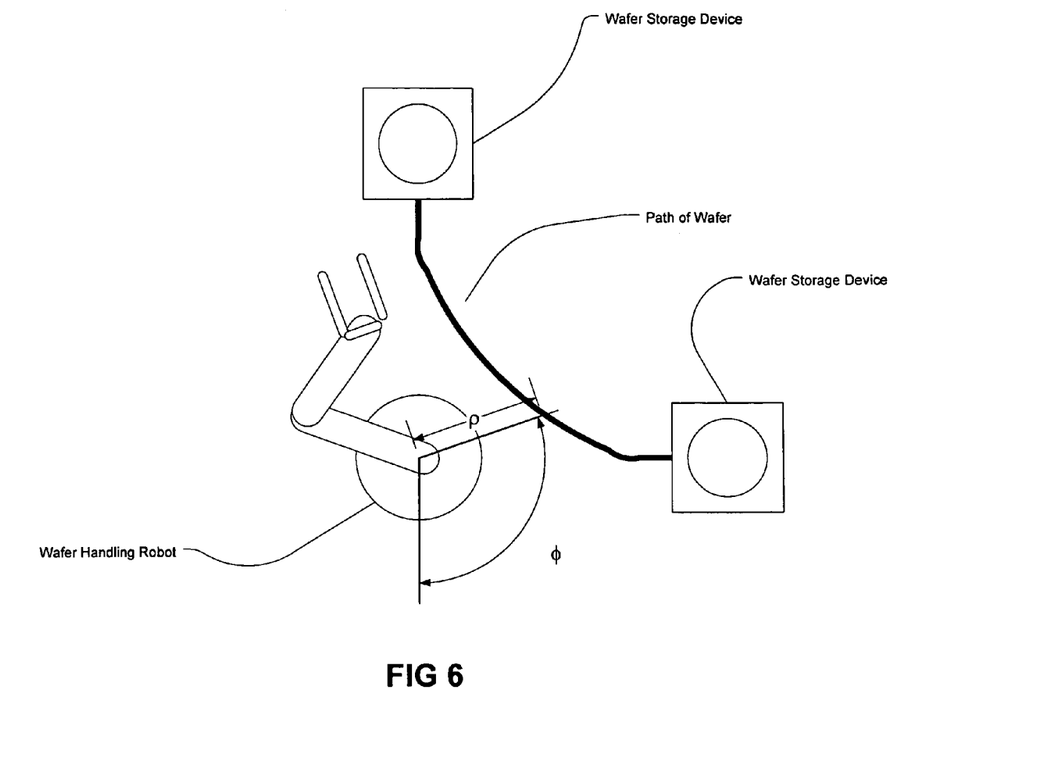
FIG. 6 illustrates details of an arced path according to the present invention.

The position of the wafer along the arc will be defined using polar coordinates, ρ. and φ. as in FIG. 6.

The components of velocity along the arc are defined through the following equations.

$$V_t = \rho \phi' \quad (-1)$$

$$V_r = \rho'. \quad (0)$$

The tangential and radial velocities are represented by the variables, V_t and V_r, respectively. ρ is the radial position and ρ' is its first derivative with respect to time. φ'. is the first derivative of the angular position with respect to time.

In order to ensure continuous velocity at the transition, point o, two constraints are imposed on the arc. First the radial velocity, $V_{r\_o}$, and thus $\rho'_o$ must equal zero.

$$V_{r\_o} = \rho'_o = 0, \quad (2)$$

where the subscript o denotes the instantaneous value of the variable at the transition.

Second, the tangential velocity must equal the velocity of the wafer at the end of the line segment. Consequent to these constraints, the arc must be tangent to the velocity vector of the previous move segment with which it connects at point o.

$$V_{t\_o} = \rho_o \phi'_o = V_{out}. \quad (1)$$

To further ensure smooth motion, the acceleration of the wafer will also be continuously differentiable. The acceleration of the wafer is also expressed in radial and tangential components along the path.

$$A_t = \rho \phi'' + 2\rho'\phi' \quad (3)$$

$$A_r = \rho'' - \rho \phi'^2, \quad (4)$$

where $A_t$ and $A_r$ are the tangential and radial components of acceleration, respectively. ρ" and φ" are the second derivatives of radial and angular orientation with respect to time, respectively.

For simplification, the total wafer acceleration at point o is zero. Therefore, the orthogonal components of acceleration along the arc at point o are, $$A_{to} = \rho_o \phi''_o + 2\rho'_o \phi'_o = 0 \quad (5)$$

$$A_{ro} = \rho''_o - \rho_o \phi'^2_o = 0 \quad (6)$$

From (2) $\rho'_o = 0$ and from (5) $A_{to} = 0$. Thus, $$\phi''_o = 0 \quad (7)$$

From (1), the tangential velocity is necessarily non-zero and therefore the centripetal acceleration will be non-zero as well. In order to ensure (6), the radial acceleration will be designed to be equal and opposite to the centripetal acceleration, $$\rho''_o = \rho_o \phi'^2_o \quad (7a)$$

Similarly, to ensure continuous velocity and acceleration through the transition at the end of the arc, identical boundary conditions are imposed on the point f.

$$V_{t\_f} = \rho_f \phi'_f = V_{out} \quad (8)$$

$$\phi''_f = 0 \quad (9)$$

$$\rho'_f = 0 \quad (10)$$

$$\rho''_f = \rho_f \phi'^2_f. \quad (11)$$

In order to solve the boundary value problem imposed by the above constraints on ρ and its derivatives, a sinusoidal function in time is employed with frequency, ω. The frequency, ω is structured such that, $$\omega = 2\pi/\Delta t, \quad (12)$$

where, $$\Delta t = t_f - t_o. \quad (13)$$

$t_o$ and $t_f$ are the times at transition point o and point f, respectively.

1.1 Radial Position and its Derivatives

The second derivative of radial position with respect to time is defined as, $$\rho''(t) = \rho_o \phi'^2_o \cos(\omega(t-t_o)). \quad (14)$$

The first derivative of radial position is defined as, $$\rho'(t) = \rho_o \phi'^2_o/\omega \sin(\omega(t-t_o)). \quad (15)$$

The radial position is defined as, $$\rho(t) = \rho_o + \rho_o \phi'^2_o/\omega^2 (1 - \cos(\omega(t-t_o))). \quad (15a)$$

1.2 Angular Position and its Derivatives

The second derivative of angular position with respect to time is also defined as a sinusoidal function, $$\phi''(t) = -B \sin(\omega(t-t_o)). \quad (16)$$

The first derivative of angular position with respect to time is defined as, $$\phi'(t) = \phi'_o + B/\omega(\cos(\omega(t-t_o)) - 1). \quad (17)$$

The angular position is defined as, $$\phi(t) = (\phi'_o - B/\omega)(t-t_o) + B/\omega^2 \sin(\omega(t-t_o)) + \phi_o. \quad (18)$$

The angular position at the completion of the arc, at time $t_f$ is, $$\phi_f = \phi(t_f) = (\phi'_o - B/\omega)(t_f - t_o) + B/\omega^2 \sin(\omega(t_f - t_o)) + \phi_o. \quad (19)$$

The total angular displacement between point o and f is, $$\Delta\phi = \phi_f - \phi_o. \quad (19a)$$

From (13) and (19), the time necessary to move between point o and f is, $$\Delta t = \Delta\phi/(\phi'_o - B/\omega) \quad (20)$$

Solving for ω given (12), (19a) and (20), $$\omega = \pi\phi'^2_o/(2\Delta\phi)6(\pi/\Delta\phi(\pi\phi'^2_o/\Delta\phi - 2B))^{1/2} \quad (22)$$

In order for ω to be real, $$B*\pi\phi'^2_o/(2\Delta\phi) \quad (23)$$

The case where B is zero corresponds with constant angular velocity and ω reduces to, $$\omega(B=0)\pi\phi'^2_o/(2\Delta\phi)6\pi\phi'^2_o/(2\Delta\phi) = \pi\phi'^2_o/\Delta\phi \text{ or } 0. \quad (24)$$

For a non-zero frequency, ω, the quadratic equation requires a +. Therefore, $$\omega = \pi\phi'^2_o/(2\Delta\phi)1(\pi/\Delta\phi(\pi\phi'^2_o/\Delta\phi - 2B))^{1/2} \quad (25)$$

To simplify further calculations, the variable β is introduced as $$\beta = B2\Delta\phi/(\pi\phi'^2_o), \quad (28)$$

Substituting (28) into (25)

$$\omega = \pi\phi'_o/\Delta\phi(1 + (1-\beta)^{1/2}) \quad (30)$$

Due to the sinusoidal nature of equations (15) and (16), $\rho'$ and $\phi''$ at $(\Delta t/2)$ are both zero. Therefore, from (3), the tangential acceleration at $(\Delta t/2)$ is always zero.

$$A_t(\Delta t/2)=0. \quad (31)$$

Substituting the sinusoidal functions into (4) and then recognizing (12), the radial component of acceleration at $(\Delta t/2)$ is, $$A_r(\Delta t/2)=\rho''(\Delta t/2)+\rho(\Delta t/2)\phi'(\Delta t/2)^2 \quad (32a)$$

Where, $$\rho''(\Delta t/2)=\rho_o\phi'_o{}^2 \cos(\omega\Delta t/2) \quad (32b)$$

$$=-\rho_o\phi'_o{}^2, \quad (32c)$$

$$\rho(\Delta t/2)=\rho_o+\rho_o\phi'_o{}^2/\omega^2(1-\cos(\omega\Delta t/2)) \quad (32d)$$

$$=\rho_o+2\rho_o\phi'_o{}^2/\omega^2, \quad (32e)$$

and, $$\phi'(\Delta t/2)=\phi'_oB/\omega(\cos(\omega\Delta t/2)-1) \quad (32f)$$

$$=\phi'_o+-2B/\omega. \quad (32g)$$

Substituting (32c), (32e), and (32g) into (32a), $$A_r(\Delta t/2)=-\rho_o\phi'_o{}^2-(\rho_o+2\rho_o\phi'_o{}^2/\omega^2)(\phi'_o+-2B/\omega)^2 \quad (32h)$$

Substituting (28) and (30) into (32h), $$A_r(\Delta t/2)=-\rho_o\phi'_o{}^2C, \quad (32i)$$

where, $$C=(1+(1+2/(1+(1-\beta)^{1/2})^2(\Delta\phi/\pi)^2)(1-\beta/(1+(1-\beta)^{1/2})). \quad (33)$$

It is important to note that C is a function of $\beta$ and the total angular rotation $\Delta\phi$ only.

1.3 The Arc Segment Acceleration Profile for known $\rho_o$ and $\Delta\phi$

When the initial radius, $\rho_o$, and total angular displacement, $\Delta\phi$, are known, two design constraints are imposed on the acceleration profile:

1. The maximum wafer acceleration within the arc move segment will occur at time $(\Delta t/2)$.
2. The total wafer acceleration at time, $(\Delta t/2)$, will not exceed the user specified maximum acceleration, $A_{max}$.

1.3.1 First Constraint

The total wafer acceleration is the resultant vector sum of the tangential and radial components of acceleration. The magnitude of the total wafer acceleration vector is, $$A_{total}(t)=(A_t(t)+A_r(t))^{1/2}, \quad (34)$$

Where $A_{max}(t)$ is the magnitude of the total wafer acceleration at time t. The magnitude of the total acceleration is linear in $\rho_o\phi'_o{}^2$ as shown below, $$A_{shape}(t,\beta,\Delta\phi)=A_{total}(t)/(\rho_o\phi'_o{}^2). \quad (35)$$

From (33b), the shape of the acceleration profile, $A_{shape}(t, \beta, \Delta\phi)$, will be a function of $\beta$ and $\Delta\phi$ alone. Therefore, the first constraint may be satisfied by ensuring that for a given $\Delta\phi$, the selected $\beta$ must lie within an allowable range of $\beta$ such that the maximum acceleration occurs at $(\Delta t/2)$.

As may be observed in the above equations, $A_t(t)$ and $A_r(t)$, are each composed of non-linear functions. Therefore, the explicit solution for the maximum acceleration along the acceleration profile would be extremely difficult. Since the total acceleration is of high order in time, multiple solutions could potentially exist over the range of $\Delta t$ for individual values of $\beta$.

The trivial case occurs when $\beta$ equals zero, when the angular velocity is constant over the arc. The acceleration will always be greatest at $(\Delta t/2)$ for all $\Delta\phi$. The bounding values above and below $\beta$ are sought as a function of $\Delta\phi$ to provide the allowable range of $\beta$ for a given $\Delta\phi$.

Maximum Beta as a function of total rotation

The maximum values for $\beta$, $\beta_{max}(\Delta\phi)$, are found algorithmically. For each value of $\Delta\phi$, $\beta$ is incremented from 0 in positive increments of $\delta\beta$. For each successive value of $\beta$, $A_{shape}(t, \beta, \Delta\phi)$ is calculated for all t between 0 and $\Delta t$ and the maximum value is stored. For each successive value of $\beta$, C is calculated from (33). The first constraint has been violated when $\max(A_{shape})$ is greater than C. The maximum allowable value of $\beta$ for the particular value of $\Delta\phi$, $\beta_{max}(\Delta\phi)$ is then defined as the previous iteration of $\beta$.

Once $\beta_{max}(\Delta\phi)$ has been found over the range of $\Delta\phi$, $\beta_{max}(\Delta\phi)$ may be approximated as a third order polynomial, $$\beta_{max}=p_1\Delta\phi^3+p_2\Delta\phi^2+p_3\Delta\phi+p_4. \quad (36)$$

Where $p_1$ through $p_4$ are the third order, least squares polynomial coefficients relating $\beta_{max}$ to $\Delta\phi$.

Minimum Beta as a function of total rotation

Similarly, the minimum values for $\beta$, $\beta_{min}(\Delta\phi)$, are found algorithmically. For each value of $\Delta\phi$, $\beta$ is incremented from 0 in decrements of $-\delta\beta$. For each successive value of $\beta$, $A_{shape}(t, \beta, \Delta\phi)$ is calculated for all t between 0 and $\Delta t$ and the maximum value is stored. For each successive value of $\beta$, C is calculated from (33). The first constraint has been violated when $\max(A_{shape})$ is greater than C. The minimum allowable value of $\beta$ for the particular value of $\Delta\phi$, $P_{min}(\Delta\phi)$, is then defined as the previous iteration of $\beta$.

Once $\beta_{min}(\Delta\phi)$ has been found over the range of $\Delta\phi$, $\beta_{min}(\Delta\phi)$ may be approximated as a third order polynomial, $$\beta_{min}=p_5\Delta\phi^3+p_6\Delta\phi^2+p_7\Delta\phi+p_8. \quad (37)$$

Where $p_5$ through $p_8$ are the third order, least squares polynomial coefficients relating $\beta_{min}$ to $\Delta\phi$.

The range of allowable $\beta$ lies between the lower and upper bounds, $$\beta_{min}*\beta*\beta_{max}. \quad (38)$$

Figure 7:
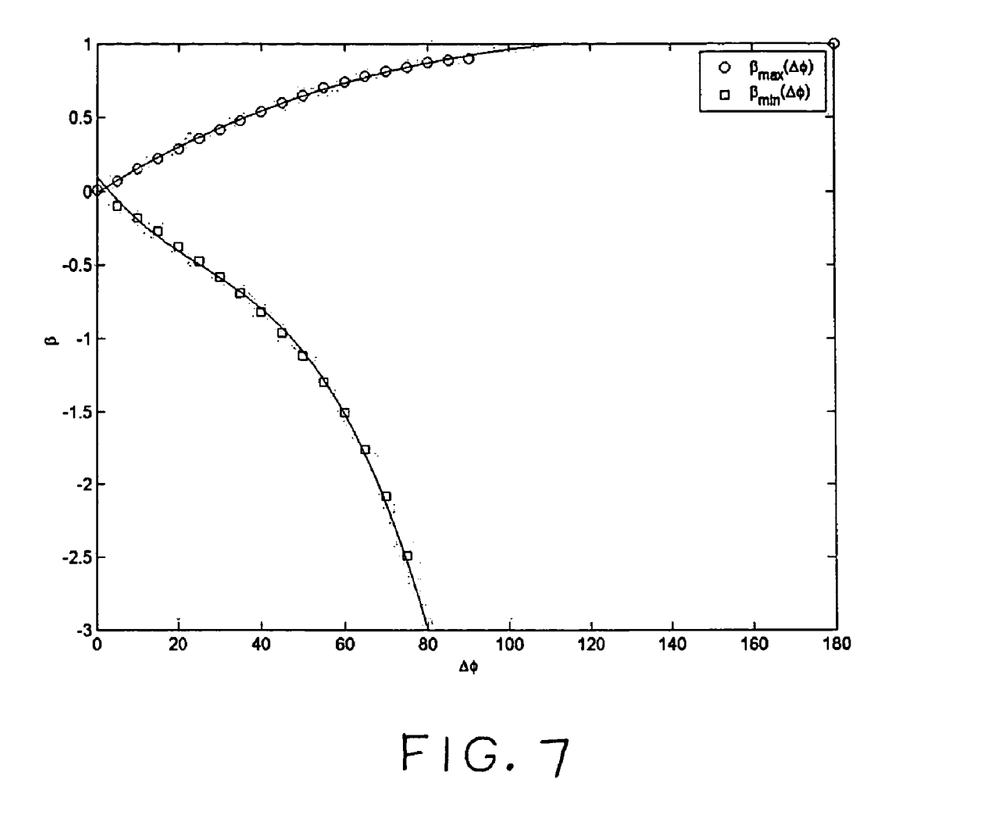
FIG. 7 is a plot of minimum and maximum values of $\beta$ over a specified range of $\Delta\Phi$.

The plot of minimum and maximum values of $\beta$ over the specified range of $\Delta\phi$ is shown in FIG. 7.

1.3.2 Second Constraint

The value of $V_{out}$ is integral to the design of the arc motion profile. $V_{out}$ will always be greater than zero. For a given $\rho_o$, $\Delta\phi$, and $A_{max}$, there is a maximum allowable entry/exit velocity, $V_{outmax}$, such that, $$0<V_{out}*V_{outmax}. \quad (39)$$

For unspecified velocity, Vout

From the first constraint, the maximum acceleration will occur at $(\Delta t/2)$. From (32I), the acceleration at $(\Delta t/2)$ will be composed entirely by radial acceleration, $A_r$. The second derivative of radial position at $(\Delta t/2)$ is not influenced by the selection of $\beta$. However, the centripetal acceleration component, $\rho(\Delta t/2)\phi'(\Delta t/2)^2$ may be decreased by implementing positive $\beta$. The maximum allowable decrease, and thus the maximum allowable $V_{out}$ will occur for $\beta=\beta_{max}$ from (36).

Solving for the corresponding value for C, $$C_{max}=C(\beta_{max},\Delta\phi) \quad (40)$$

Where $C_{max}$ is the maximum allowable value for C.
From (34) and (1), $$V_{outmax} = (A_{max} \rho_o / C_{max})^{1/2} \quad (41)$$

Finally, from (1), $$\phi'_o = V_{outmax} / \rho_o. \quad (42)$$

For specified velocity, Vout

Often, due to constraints outside of the design of the individual arc move segment, $V_{out}$ will be some specified value adhering to (39).

Similar to (42) the initial angular velocity is, $$\phi'_o = V_{out} / \rho_o \quad (42a)$$

In this case, $\beta_{max}$ could be applied, however, the angular rotation will be brought to an unnecessarily slow rate such that the magnitude of the acceleration at ($\Delta t/2$) is less than the maximum allowable acceleration, $A_{max}$. This could waste considerable move time. In order to optimize move efficiency given $\rho_o$, $\Delta\phi$, $\phi'_o$, and $A_{max}$, an optimal $\beta$, $\beta_{opt}$ may be found such that the total wafer acceleration at ($\Delta t/2$) is equal to the maximum allowable acceleration, $A_{max}$.

Setting the magnitude of (32i) equal to $A_{max}$, $$A_{max} = \rho_o \phi'^2_o C. \quad (43)$$

Introducing the function, $$F(\rho_{opt}) = -A_{max}/(\rho_o \phi'^2_o) + C(\rho_{opt}, \Delta\phi) = 0. \quad (44)$$

For a given $\rho_o$, $\Delta\phi$, $\phi'_o$, and $A_{max}$, the optimized $\beta$ is that which satisfies (44). The function F is fourth order in $\beta$, making the explicit solution of $\rho_{opt}$ very difficult to solve. However, F is nearly linear in the operating range of $\beta$. Therefore, F may be linearized and a linear approximation for $\beta_{opt}$ may be found.

The linearized equation for optimum F, approximated at $\beta_{approx}$, $$F(\beta_{opt}) = \delta F/\delta\beta(\beta_{approx}) \cdot \beta_{opt} + F(\beta_{approx}), \quad (45)$$

where $\delta F/\delta\beta$ is the partial derivative of F with respect to $\beta$.

As in (44), the optimum value of F is zero such that (44) is satisfied. From (44) and (45), the linearly approximated solution for optimum $\beta$ is, $$\beta_{opt} = -F(\beta_{approx})/(\delta F/\delta\beta(\beta_{approx})). \quad (46)$$

The partial derivative of F with respect to $\beta$ is, $$\delta F/\delta\beta = (1+(1-\beta)^{1/2}-\beta) \cdot (-2\Delta\phi^2 \cdot (1+(1-\beta)^{1/2}-8\pi^2 \cdot (1+(1-\beta)^{1/2}-\beta)+\beta\pi^2 \cdot (4 \cdot (1-\beta)^{1/2}-1)))/(\pi^2 \cdot (1+(1-\beta)^{1/2})^5), \quad (47)$$

A reasonable point from which to approximate is $\beta_{approx} = 0$. Evaluating (47) at $\beta$ equals zero, $$\delta F/\delta\beta(\beta_{approx}=0) = (\Delta\phi/\pi)^2 \cdot (2-1/(4\pi^2)) \quad (48a)$$

$$= 0.2001 \cdot \Delta\phi^2. \quad (48b)$$

The value of F at the approximated point must be determined as well.

$$F(\beta_{approx}=0) = -A_{max}/(\rho_o \phi'^2_o) + 2 \cdot (1+(\Delta\phi/\pi)^2). \quad (49)$$

For the case where ($\beta_{approx}=0$), $$\rho_{opt} = (A_{max}/(\rho_o \phi'^2_o) - 2 \cdot (1+(\Delta\phi/\pi)2))/(0.2001 \cdot \Delta\phi^2). \quad (50)$$

For any predefined $\beta_{approx}$, the coefficients required to determine $\beta_{opt}$ may be calculated and saved a priori of the real time calculation.

Figure 8:
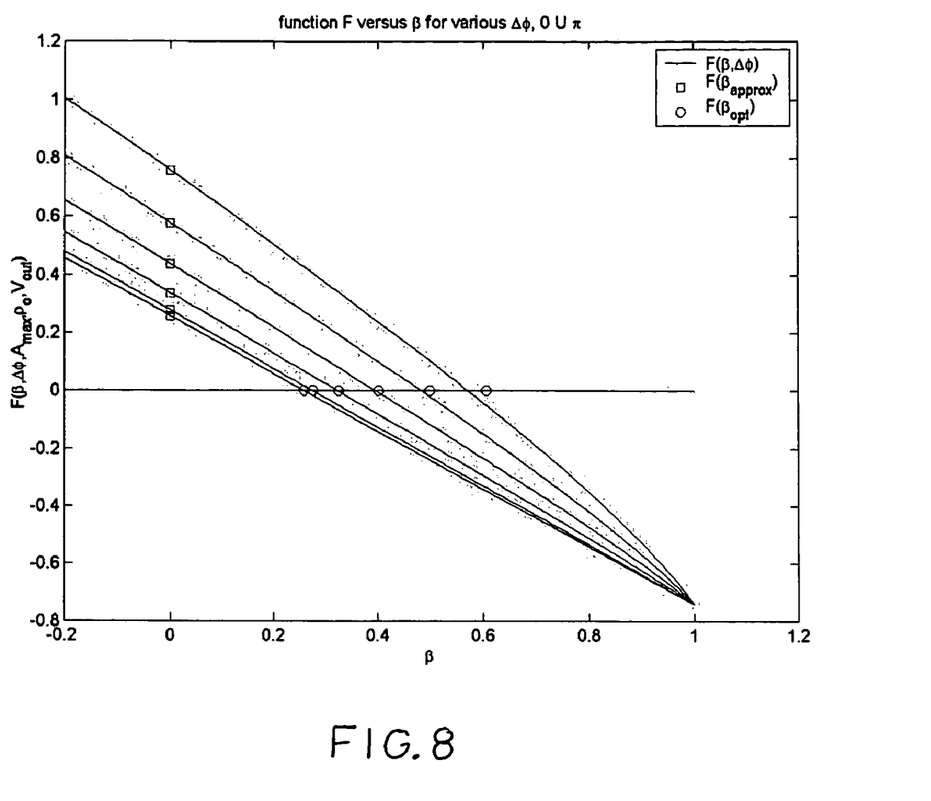
FIG. 8 is a plot of F versus $\beta$.

FIG. 8 is a plot of the function F versus $\beta$ for various $\Delta\phi$, from zero to $\pi$.

Because the shape of the function F over $\beta$ is convex, the linearization will always over-approximate the value of $\beta$ to some degree. The fact that it may only be over estimated is desirable because a larger than truly optimal $\beta$ will only serve to reduce the maximum speed of angular velocity. Therefore, the maximum acceleration will never exceed $A_{max}$.

A final check is imposed on the value of $\beta_{opt}$. If $\beta_{opt}$ is greater than $\beta_{max}$ then $\beta_{opt}$ is set equal to $\beta_{max}$. Similarly, if $\beta_{opt}$ is less than $\beta_{min}$ then $\beta_{opt}$ is set equal to $\beta_{min}$. Therefore, $\beta_{opt}$ satisfies (38).

$$\beta_{min} * \beta_{opt} * \beta_{max}. \quad (52)$$

1.4 The Arc Segment Acceleration Profile for unknown $\rho_o$ and $\Delta\phi$ If the geometry of the arc has not been specified, the rotational displacement of the arc, $\Delta\phi$, and initial arc radius, $\rho_o$, is unknown. If this is the case, $V_{out}$ will be specified outside the design of the arc. For unknown $\Delta\phi$, two rules apply in order to avoid violating the above acceleration constraints. First, the maximum value of $\Delta\phi$ must be assumed. Second, $\beta$ must equal zero. With these rules in place, for any $\Delta\phi$, the acceleration shape will not violate acceleration constraint one. As stated above, the acceleration shape, $A_{shape}(t, \beta, \Delta\phi)$, will never violate acceleration constraint one if $\beta$ equals zero.

$$\beta = 0. \quad (52)$$

For a maximum allowable angular displacement of $\Delta\phi = \pi$ and from (52), evaluation of (33) and (34) produces, $$C(\beta=0, \Delta\phi=\pi) = 2.5, \quad (53)$$

$$A_{max} = 2.5 \rho_o \phi'^2_o \quad (54)$$

$$\phi'_o = A_{max}/(2.5 V_{out}) \quad (55)$$

Since C is predetermined in this case, the $\rho_o$ to allow for maximum acceleration may be found through the equation, $$\rho_o = 2.5 V_{out}^2 / A_{max}. \quad (56)$$

2. Path Planning Implementation

This section describes how the path planning algorithm described theoretically in Section 1 has been implemented. Also, note that the discussion below makes the assumption that the path planning implementation is used on a robot. Nevertheless, the applicability of path planning algorithm is not exclusive to robots.

2.1 General Description

In the current implementation, the path is a combination of line segments and sinusoidal-arc segments. The path will be specified by multiple number of points (N>=1). If the user specifies only one point then the path will be a straight line between the current position and the specified point. If two points are specified then the path will comprise of two straight-line segments and a sinusoidal-arc connecting the two line segments. For an illustration of how the path planning algorithm works see FIG. 9. This path is generated by specifying three points.

Figure 9:
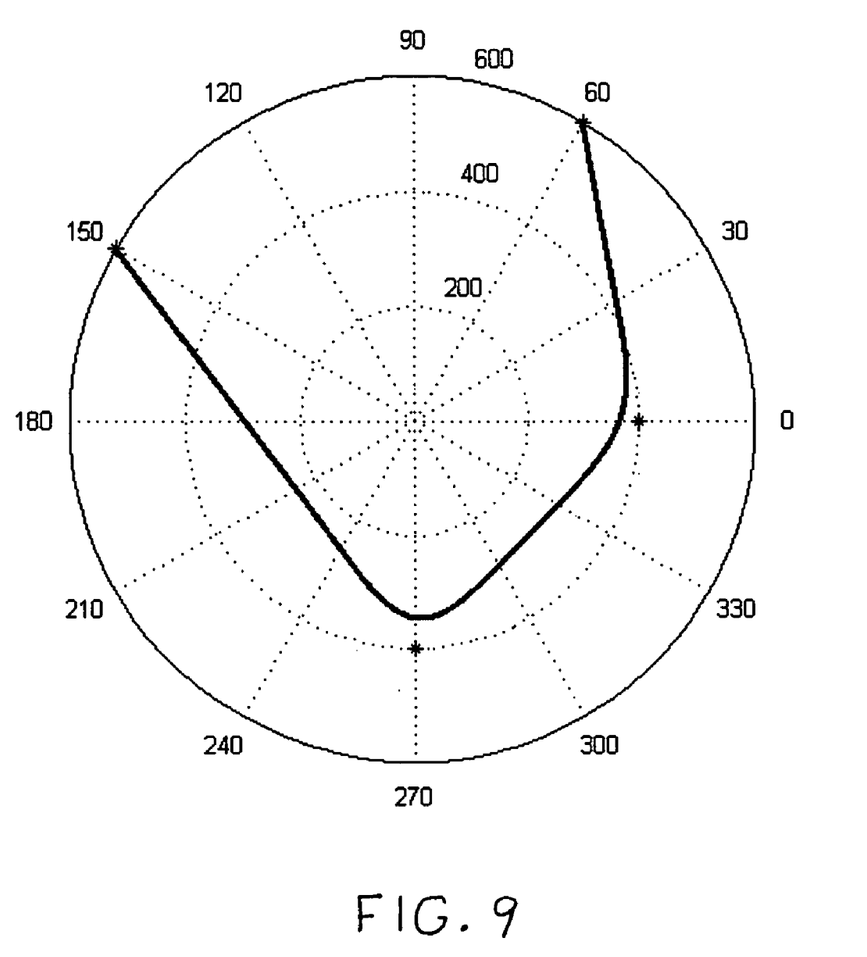
FIG. 9 is a chart given as an example of path generation using the planning algorithm.

For the above example the motion starts from the point (600, 150) where 600 is the radial distance [mm] from origin and 150 is the angle in degrees from 0 (counter-clockwise). The user will specify three points to generate this path: (400, 270), (400, 0) and finally (600, 60). The starting point and the user-specified points are indicated in FIG. 9 by asterisks.

As part of the setup of the motion parameters, the user must set maximum acceleration, and maximum allowable jerk. The implementation will ensure that the path generated will reach the maximum acceleration during the sine-wave-arc, and stay within the maximum allowable jerk.

For the path to begin the arm must be at rest, or cruising at a constant velocity in a straight-line (as a result of an earlier path command). At the time of the path command, if the arm is not cruising then the new path command will be queued until the arm reaches cruise velocity (constant velocity), or until arm comes to rest.

The current implementation has the capacity to do two-dimensional path planning as described in section 1, and at the same time coordinate the move of a third axis. The third axis would typically be a Z-axis (Lift) for a robot. Thus as soon as the wafer has cleared a station the Z-axis can be commanded to move and this Z-move would be done before the arm reaches the entrance point of the next wafer station. However, note that Z-move is an independent move except that the start and end time is coordinated with the path planning move. In other words, we do not propose a three-dimensional path planning algorithm.

2.2 Path Planning Parameters

Motion control requires that user specify parameters such as maximum acceleration, maximum velocity, etc., before the motion command is issued. Once the motion command is issued, the motion control software generates a motion profile (for position, velocity, and acceleration) that the closed loop control algorithm will attempt to track. The profiler algorithm may be S-curve or trapezoidal algorithm, where those names refer to the shape velocity profile curve. Depending on whether the velocity profile is S-curve or trapezoidal, the number of parameters needed would vary.

The same profiler parameters mentioned above would also be needed for motion along the path also. However, for specifying motion along a path we will need additional parameters. They are:

1. Safe start and end distances (Ds, De): The motion at the start of the path and at the end is constrained to be in a straight-line for a user-specified distance. The safe start distance would make sure that when the robot arm will not start on the arc until the arm is safely out of the cassette. The safe end distance would make sure that the robot arm has finished the arc and is traveling in a straight-line as the arm is moving into the cassette. These same distances are used to denote when to start and end Z-move. These clearances for Z-move may also be defined separately from Ds and De.
2. Singularity radius (Rs): A region around the origin (center of robot) is excluded for path planning. This is because closer the path gets to the center of the robot, greater the rotational velocity needed to achieve the motion.
3. Maximum Jerk (Jm): Maximum allowable jerk that is allowed during the move (jerk is derivative of acceleration).

2.3 Definition of Wafer Obstacles

Every defined wafer station will, in itself, represent an obstacle. Thus the path must have prior knowledge of these obstacles so that the obstacles can be avoided. The obstacle will be defined by specifying a center, radius, and a height (cylinder). If need arises additional shapes will be included in the future (sphere, cube, etc.). The checks for obstacles will be done at the start of the move to see if the generated path will encounter any obstacle. Also during runtime, there will be checks to see if the actual position gets "too close" to an obstacle.

2.4 Path Feasibility

When the user issues a path command, the path generation algorithm checks for the feasibility of the path algorithm before the motion begins—so that the path can be successfully completed. The path may not be feasible for several reasons:

1. The first point may be too close to the starting point to reach cruise velocity. The last point may be too close to the second to last point for sufficient stopping distance.
2. User selected target positions (for defining the path) may be too close together to generate a path within the selected maximum acceleration.
3. The path will violate the maximum allowable jerk.
4. The path generated will run into obstacles.

2.5 Path Generation Implementation

This section will describe the steps involved in generating the path. First we provide an overview of the steps involved. Then we provide details of the crucial steps involved.

Figure 10:
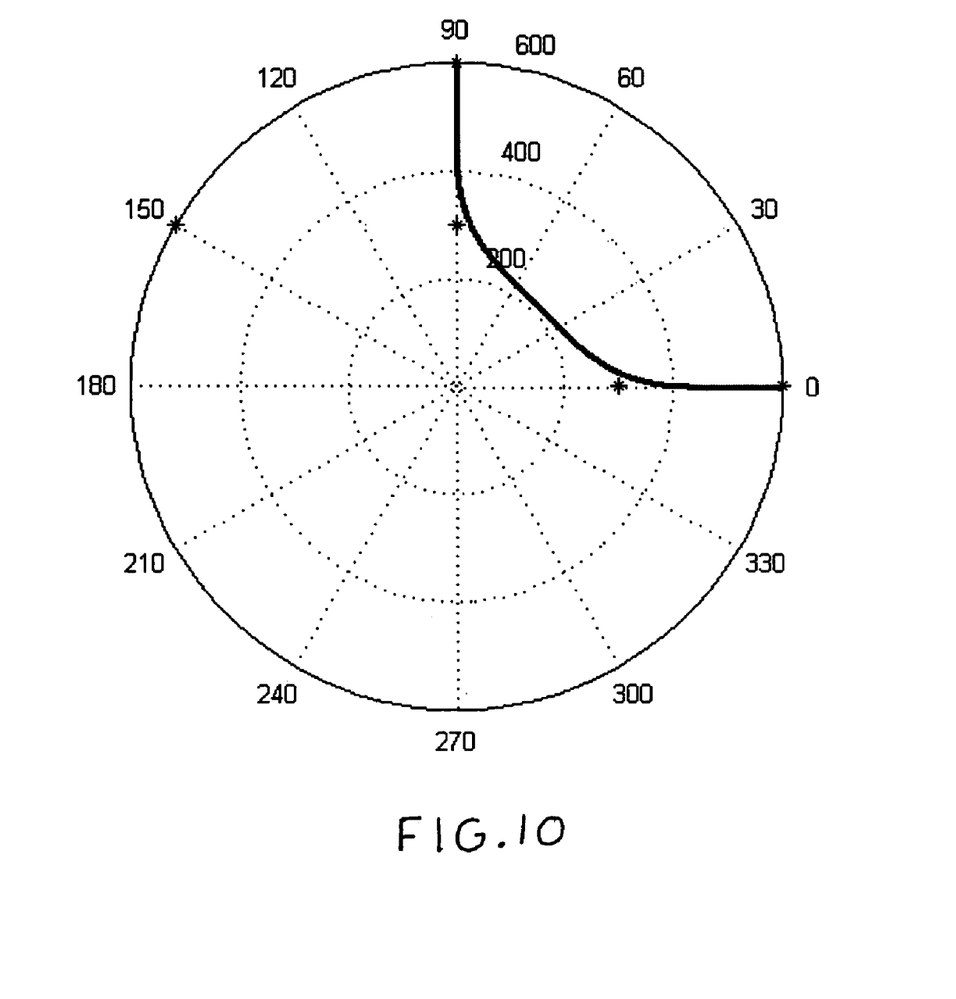
FIG. 10 is a chart given as an example of path planning.

In the example below, to simplify matters, it is assumed that user specifies only three points. See FIG. 10. Generating paths with more than three points can easily be extrapolated from this example. Once the two-dimensional path is generated, then that path will be converted into motion profiles for the motors that drive the robot. This will be explained later in Section 2.6.

Say the user has set the profiler and the path-specific parameters and issued a path command with two target positions. Here are the steps involved:

1. The firmware checks for path feasibility. See Section 2.4 for more details.
2. The arm accelerates towards the first target position in straight-line until the arm reaches cruise velocity. Here note that algorithm does not wait until the actual velocity reaches cruise velocity. Rather the arm waits until the profile velocity reaches cruise velocity. Closed loop control algorithms will ensure that actual velocity will track the profiled velocity within user defined error bands.
3. After the cruise velocity has been reached, the maximum acceleration constraint would require that at a certain distance from the next target position (towards which the arm is moving) the sine-wave-arc begin. Moreover, the maximum acceleration will be reached half way through the arc.
4. After the arc is finished the arm is traveling at cruise velocity towards the second target position.
5. Same as step 3 above. Note that the distance (from the next target position) at which the sine-wave-arc begins may vary at each of the target positions.
6. After the arc is finished the arm is traveling towards the final target position in a straight-line at cruise velocity.
7. Once the arc is finished, the distance between the arm and the final target position will be greater than safe end distance (De). If this could not be achieved, an error would have been generated before the motion started.
8. The arm comes to a complete stop by the final target position.

In the above example, it is assumed that the arm is at rest before the path command is issued. It is possible to issue a path command while the arm is in the middle of an earlier path command. The new path command would be queued until the earlier path has reached cruise velocity (or zero, i.e., stopped) and is traveling in a straight-line. The rest of the steps would be executed in a similar manner as above.

Now we will describe in more detail the crucial steps involved in the path generation. The path implementation uses the same fundamental idea described in Section 1 (combinations straight-line segments with sinusoidal arcs), with the following differences:

1. Path algorithm uses Cartesian coordinate frame, rather than polar coordinate frame.
2. In the write-up earlier it was assumed that $\rho(t)$ and $\phi(t)$ are explicit sinusoidal functions. Here y(t) is a sinusoidal function of x(t). This assumption simplifies the calculations dramatically so that real-time implementation is more readily possible.
3. In this approach we can achieve the maximum acceleration (which means faster move times). In the approach taken in Section 1, the acceleration was only guaranteed to be under the maximum acceleration.
4. In this approach, the maximum jerk can be easily calculated, whereas jerk was not calculated in the approach in Section 1. This will ensure that we will always stay under a user defined maximum jerk.

Say the robot arm is at rest at position $(\rho_0, \phi_0)$, in polar coordinates with origin at the center of the robot. See FIG. 11. Say the user issues a path command with positions $(\rho_1, \phi_1)$ and $(\rho_2, \phi_2)$. As described in the steps above, the robot arm will first travel towards $(\rho_1, \phi_1)$ in a straight-line until the arm reaches cruise velocity. This part is straightforward to implement—break up the motion into an independent motion in $\rho$ (or $\phi$), and the other coordinate is dependent on the freely moving coordinate so that straight-line motion is accomplished. Once the cruise velocity is reached, say $V_0$, we are traveling towards $(\rho_1, \phi_1)$ in a straight-line (this straight-line is the line connecting $(\rho_0, \phi_0)$ and $(\rho_1, \phi_1)$. Say the sine-wave-arc begins at point $(X_0, Y_0)$—here we switch to Cartesian coordinate system for convenience.

Figure 11:
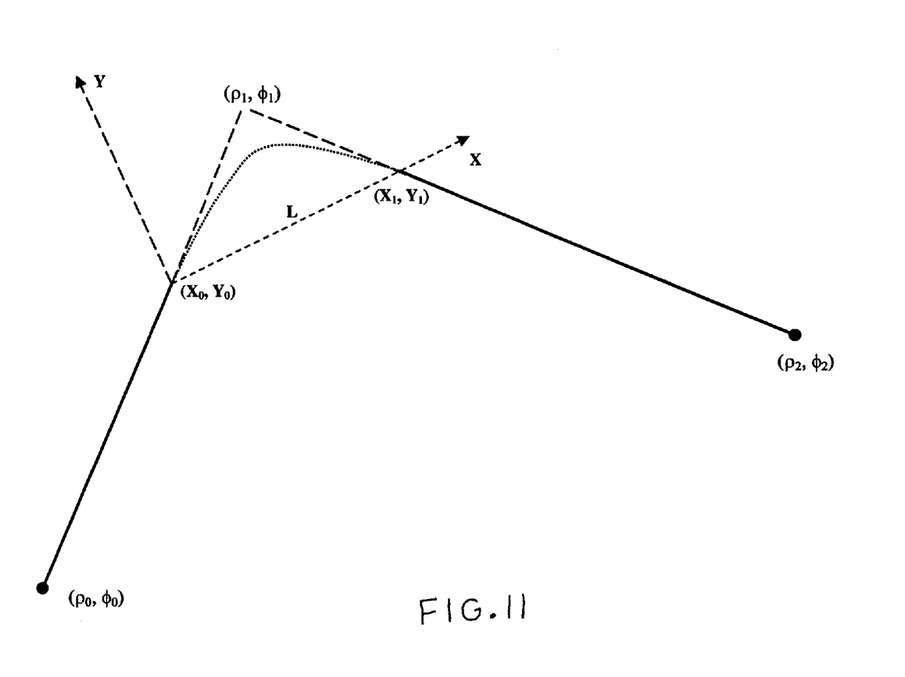
FIG. 11 is an illustration for explaining the sine-wave-arc generation.

Say the sine-wave-arc begins at point $(X_0, Y_0)$—here we switch to Cartesian coordinate system for convenience. We will take this position $(X_0, Y_0)$ as the origin of the Cartesian coordinate system, i.e., $X_0=0$, $Y_0=0$. We will describe later how to pick $(X_0, Y_0)$. Let $(X_1, Y_1)$ be the point on the straight-line segment connecting $(\rho_1, \phi_1)$ and $(\rho_2, \phi_2)$ where the sine-wave-arc ends. Once the arc ends at $(X_1, Y_1)$ the robot arm will continue towards the final target position $(\rho_2, \phi_2)$ in a straight-line.

We already know the origin of our Cartesian coordinate system. Now we let us define the axes. The X-axis is the line connecting $(0,0)$ and $(X_1, Y_1)$, and the Y-axis is the line perpendicular to the X-axis. The arrows in the figure indicate the positive X and Y directions.

Now we have to find a sine-wave-arc that begins at $(X_0, Y_0)$ and ends at $(X_1, Y_1)$ as shown by the dotted line in FIG. 11. We make the following assumptions that restrict our range of solutions:

1. Distance between $(X_1, Y_1)$ and $(\rho_1, \phi_1)$ is the same as distance between $(0, 0)$ and $(\rho_1, \phi_1)$.
2. Once the sine-wave-arc is finished at $(X_1, Y_1)$, the arm is moving in a straight-line at the same cruise velocity $V_0$ towards $(\rho_2, \phi_2)$.
3. The Acceleration along X-axis is zero. Or in other words that velocity along X-axis remains constant.

Once we work out the mathematics, we will know that these assumptions did not restrict us from obtaining the solution we are looking for.

Let $Vx_0$ and $Vy_0$ denote starting velocities along X-axis and Y-axis respectively. They can be easily calculated from the known geometry. Let the distance between $(0,0)$ and $(X_1, Y_1)$ be L. Define also the time when the arm is at $(0,0)$ as zero.

Define position along Y-axis as a function of position along X-axis as below, $$y(t)=A\sin(\omega x(t)),$$

where $\omega=\pi/L$, and A is as yet unknown. Differentiating y(t) with respect to time (to get velocity along Y-axis), and noting that $x'(t)=Vx_0$ is a constant, $$y'(t)=A\omega Vx_0 \cos(\omega x(t)).$$

From the above equation we know that at x=0, $y'=Vy_0$. Thus, $$A=v_{y0}/(\omega Vx_0).$$

Differentiating y'(t) with respect to time again (to get acceleration along Y-axis) and noting that $x''(t)=0$, $$y''(t)=-\omega^2 A(V_{x0})^2 \sin(\omega x(t)).$$

From the above equations we can conclude that as x traverses from 0 to $X_1$, the path traversed is a sinusoidal arc as shown in FIG. 11. Also, it can be concluded that acceleration is continuous all the way through. Acceleration starts from 0 at (0,0) and goes back to 0 at $(X_1, Y_1)$.

Acceleration along Y-axis, y''(t) can be re-written as $$y''(t)=-\omega^2(V_{x0})^2 y(t).$$

Clearly y(t) reaches its maximum value at the mid-point of the travel, i.e., x=L/2. Thus, the maximum acceleration along the path is $$y''_{max}=-\omega^2(V_{x0})^2 A.$$

Note that in calculating maximum acceleration along the path we consider only the component along Y-axis because the component along X-axis is (by design) set to zero.

From the profiler parameters we know the maximum allowable acceleration the user has set for the robot arm. Now from the above equation, and knowing that $A=v_{y0}/(\omega Vx_o)$, we can calculate the value of $\omega$, A, and L. Once we know the value of L, we know at what point the sine-wave-arc should begin.

As an aside, Jerk can be calculated as $$y'''(t)=-\omega^3 A(V V_{xo})^3 \cos(\omega x(t)).$$

From the above equation it can be seen that jerk is discontinuous at the start and end of the sine-wave-arc. However, the magnitude of the maximum jerk is $$y''' \max=-\omega^3 A(V_{xo})^3,$$

which can be re-written as $$y'''_{max}=A\omega y''_{max}=y''_{max} V_{y0}/Vx_0.$$

From the above equations, we can see that the maximum jerk is achieved at the beginning and at the end of the sine-wave-arc. More importantly, once the user picks the maximum acceleration and cruise velocity, the maximum jerk is automatically determined. Consequently, although we can make sure that we achieve the maximum acceleration during the arc, we can only ensure that we stay under a maximum allowable jerk $y'''_{max}$.

Also note that $V_{yo}/V_{xo}$ is the slope of the straight-line connecting $(\rho_0,\phi_0)$ and $(\rho_1, \phi_1)$ with respect to the Cartesian coordinate frame X-Y. These slopes (one for each sine-wave-arc) are fixed once the user picks the target positions. Thus, for a given move the maximum allowable jerk is exceeded, the user has three different options:

1. Lower the maximum acceleration.
2. Increase the angle between straight-line segment (i.e., angle between line from $(\rho_0, \phi_0)$ to $(\rho_1,\phi_1)$ and line from $(\rho_1, \phi_1)$ to $(\rho_2, \phi_2)$ in FIG. 11) at the target position where the maximum 28 jerk is violated.

In other words, once the user picks the maximum acceleration, the maximum angle between straight-line segments connecting intermediate target positions are constrained to be under a certain pre-computed value.

2.6 Robot Motion Control

The path motion profile (path position, path velocity, path acceleration) is calculated in real-time (every 0.5 milliseconds). As each point in the path motion profile is calculated, that information is translated into the position, velocity, and acceleration of the motors that drive the robot. This translation is also done in real-time (every 0.5 milliseconds). Once the motion profiles for the motors are calculated that information is used to control the motors in real-time (every 0.5 milliseconds) in closed loop so that the actual position, velocity, and acceleration of the robot arm tracks the path generated by the path planning algorithm.

Although a preferred embodiment of the present invention has been described above, it will be appreciated that certain modifications or alterations thereon will be apparent to those skilled in the art. It is therefore requested that the appended claims be interpreted as covering all such alterations and modifications that fall within the true spirit and scope of the invention.

What is claimed is:

1. A wafer handling system comprising:
(a) a robot with an axis of rotation and a bifurcated arm, and a wafer manipulator, said robot for moving a wafer along a path having a plurality of segments from a first location to a second location; and
(b) control apparatus for moving said wafer along said path under controlled condition so as to limit acceleration and jerk, and wherein said controller calculates and directs a path trajectory with an optimized maximum path acceleration for the movements of the wafer manipulator, producing arm movement along the path trajectory by calculating the maximum acceleration and jerk for each of a series of straight line segments and interconnecting sinusoid paths over the path trajectory to minimize the total path trajectory length and maintain maximum path acceleration for the move from the first location to the second location.

2. A system as recited in claim 1 wherein said control apparatus directs said robot to move said wafer with non-zero velocity at all points in moving from a particular selected one of said path segments to a next path segment following said particular one of said segments.

3. A system as recited in claim 2 wherein the controller controls the acceleration along the path so as to be continuously differentiable and thereby causes jerk to be finite.

* * * * *